(12) United States Patent
Cho et al.

(10) Patent No.: US 10,483,787 B2
(45) Date of Patent: *Nov. 19, 2019

(54) WIRELESS CHARGING APPARATUS BASED ON THREE-DIMENSIONAL (3D) WIRELESS CHARGING ZONE

(71) Applicant: Electronics and Telecommunications Research Institute, Daejeon (KR)

(72) Inventors: In Kui Cho, Daejeon (KR); Seong Min Kim, Daejeon (KR); Jung Ick Moon, Daejeon (KR); Duk Ju Ahn, Daejeon (KR); Je Hoon Yun, Daejeon (KR); Hyung Do Choi, Daejeon (KR); Dong Won Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/265,422

(22) Filed: Feb. 1, 2019

(65) Prior Publication Data

US 2019/0165600 A1    May 30, 2019

Related U.S. Application Data

(63) Continuation of application No. 15/363,818, filed on Nov. 29, 2016, now Pat. No. 10,199,853.

(30) Foreign Application Priority Data

Dec. 21, 2015  (KR) .................. 10-2015-0182693
Mar. 9, 2016   (KR) .................. 10-2016-0028366

(51) Int. Cl.
*H02J 7/00* (2006.01)
*H02J 7/02* (2016.01)
*H02J 50/12* (2016.01)
*H02J 50/40* (2016.01)
*H02J 7/04* (2006.01)
*H02J 50/90* (2016.01)

(52) U.S. Cl.
CPC ............ *H02J 7/025* (2013.01); *H02J 7/0042* (2013.01); *H02J 7/045* (2013.01); *H02J 50/12* (2016.02); *H02J 50/40* (2016.02); *H02J 50/90* (2016.02)

(58) Field of Classification Search
CPC ............ H02J 7/025; H02J 50/90; H02J 50/12
USPC ....................................................... 320/108
See application file for complete search history.

(56) References Cited

U.S. PATENT DOCUMENTS 6,967,462 B1   11/2005 Landis
8,457,656 B2    6/2013 Perkins et al.
(Continued)

FOREIGN PATENT DOCUMENTS

JP     2014197937 A   10/2014
KR  1020090098239 A    9/2009
(Continued)

*Primary Examiner* — Suchin Parihar
(74) *Attorney, Agent, or Firm* — William Park & Associates Ltd.

(57) ABSTRACT

Provided is a wireless charging apparatus for performing wireless charging of an electronic device including a receiving coil located in a three-dimensional (3D) wireless charging zone using a plurality of transmitting coils arranged in the 3D wireless charging zone and at least one power source configured to supply a current to the plurality of transmitting coils.

12 Claims, 19 Drawing Sheets

(56) References Cited

U.S. PATENT DOCUMENTS

| | | | |
|---|---|---|---|
| 8,922,066 B2 | 12/2014 | Kesler et al. | |
| 9,059,599 B2 | 6/2015 | Won et al. | |
| 9,124,125 B2 | 9/2015 | Leabman et al. | |
| 2008/0278264 A1* | 11/2008 | Karalis | B60L 53/12 333/219 |
| 2012/0326660 A1* | 12/2012 | Lu | H02J 17/00 320/108 |
| 2014/0002012 A1* | 1/2014 | McCauley | H02J 7/025 320/108 |
| 2014/0055098 A1 | 2/2014 | Lee | |
| 2014/0091636 A1 | 4/2014 | Ofstein et al. | |
| 2014/0091756 A1* | 4/2014 | Ofstein | H02J 5/005 320/108 |
| 2014/0206384 A1 | 7/2014 | Kim et al. | |
| 2014/0232330 A1* | 8/2014 | Robertson | H01M 2/1022 320/108 |
| 2014/0252869 A1* | 9/2014 | Kamiura | H02J 7/025 307/104 |
| 2014/0292090 A1 | 10/2014 | Cordeiro et al. | |
| 2014/0375255 A1* | 12/2014 | Leabman | H02J 7/025 320/108 |
| 2015/0171658 A1 | 6/2015 | Manova-Elssibony et al. | |
| 2016/0118841 A1 | 4/2016 | Makwinski et al. | |
| 2017/0287630 A1 | 10/2017 | Pais et al. | |
| 2018/0076649 A1 | 3/2018 | Burns | |
| 2019/0052124 A1* | 2/2019 | Riehl | H02J 50/40 |

FOREIGN PATENT DOCUMENTS

| | | |
|---|---|---|
| KR | 1020120010652 A | 2/2012 |
| KR | 1020130064840 A | 6/2013 |

* cited by examiner

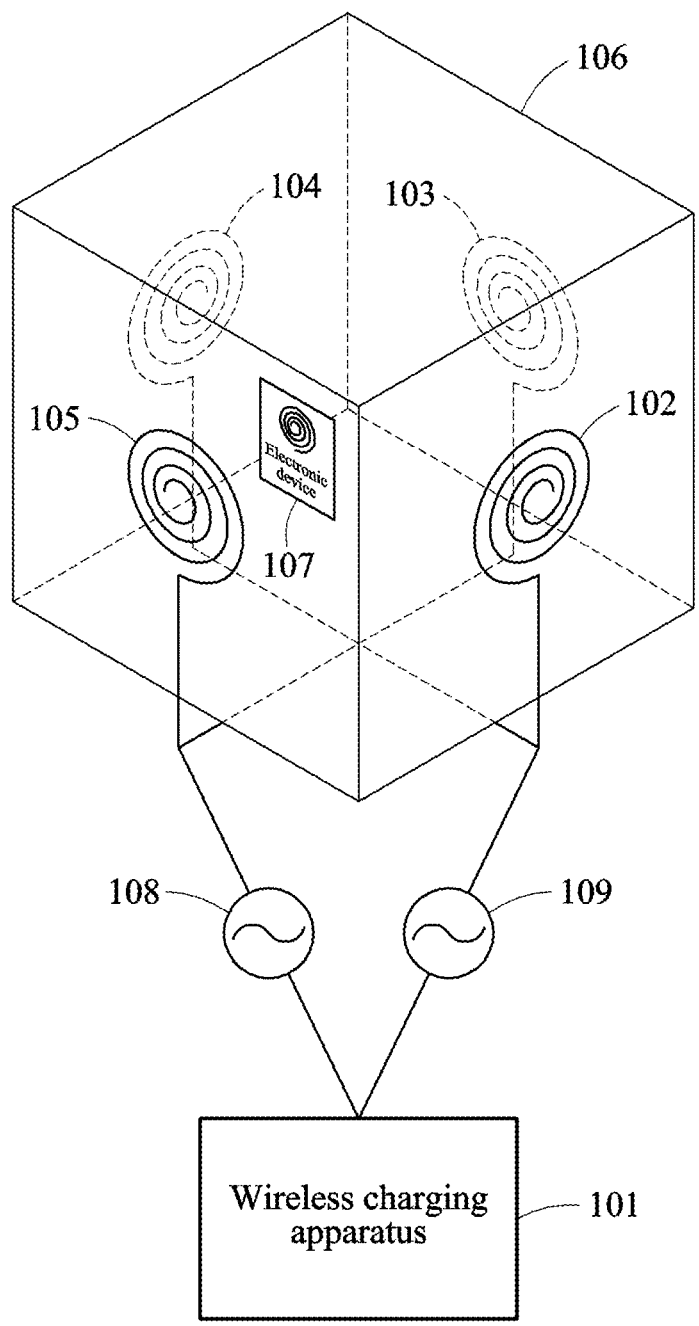

| Location of Rx (matching when θ=45°) | Efficiency |
|---|---|
| L=80mm, θ=0, Rx(0,0,0) | 87.3% |
| L=80mm, θ=0, Rx(0,300,300) | 60.3% |
| L=80mm, θ=0, Rx(0,300,-300) | 74.8% |
| L=80mm, θ=45°, Rx(0,300,300) | 74.4% |
| L=80mm, θ=-45°, Rx(0,300,-300) | $1.6*10^{-6}$% |

1. When difference in phase is absent (typical)

| freq | Pin | PL | Eff |
|---|---|---|---|
| 0.0000 Hz | 0.0000 | 0.0000 | <invalid> |
| 6.780 MHz | 2.598E-5 | 4.216E-11 | 1.623E-6 |

2. When difference in phase is given

| freq | Pin | PL | Eff |
|---|---|---|---|
| 0.0000 Hz | 0.0000 | 0.0000 | <invalid> |
| 6.780 MHz | 9.349E-4 | 3.364E-4 | 0.360 |

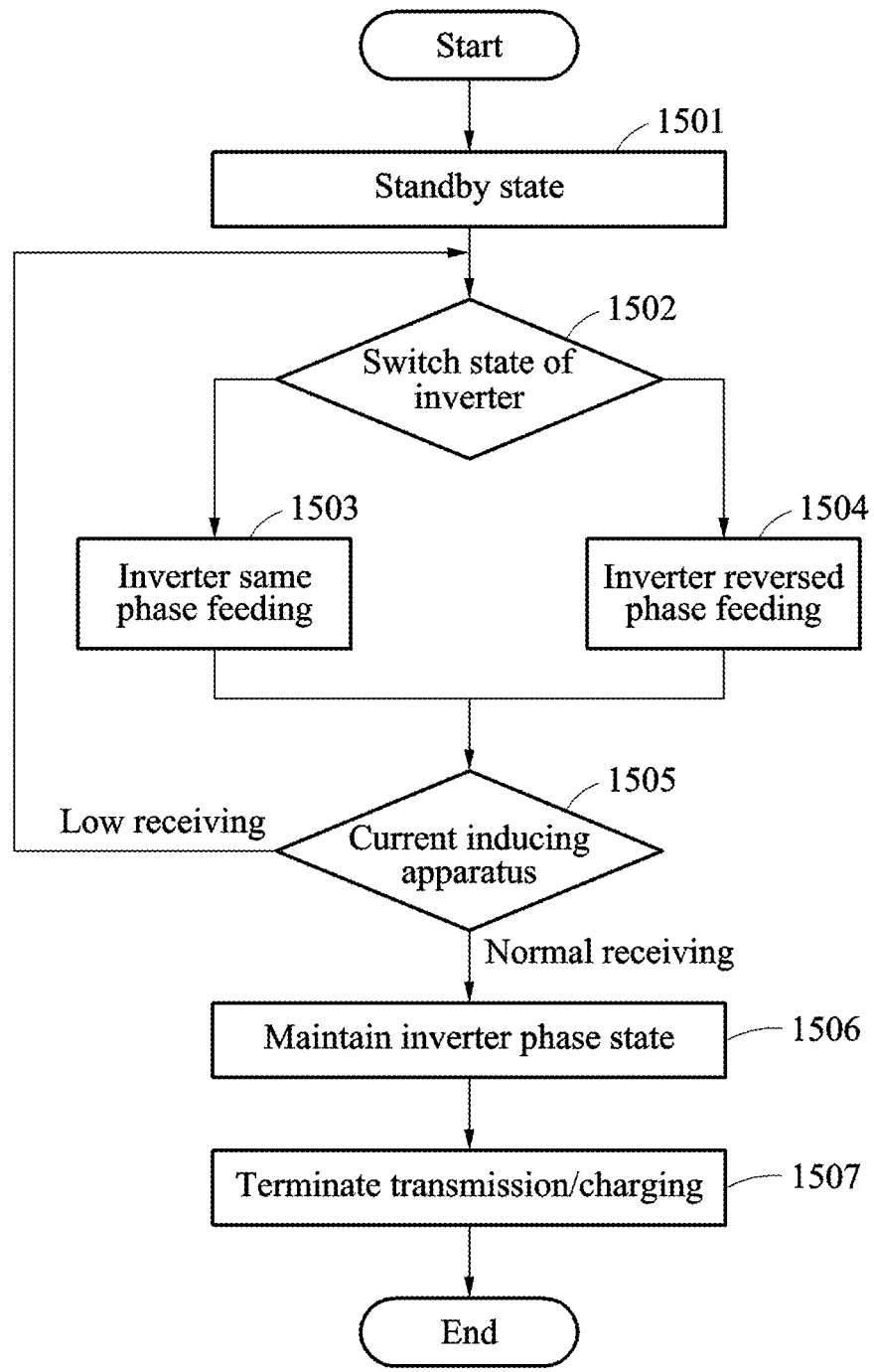

WIRELESS CHARGING APPARATUS BASED ON THREE-DIMENSIONAL (3D) WIRELESS CHARGING ZONE

CROSS-REFERENCE TO RELATED APPLICATION(S)

This application claims the priority benefit of Korean Patent Application No. 10-2015-0182693 filed on Dec. 21, 2015 and Korean Patent Application No. 10-2016-0028366 filed on Mar. 9, 2016 in the Korean Intellectual Property Office, the disclosures of which are incorporated herein by reference for all purposes.

BACKGROUND

1. Field

One or more example embodiments relate to a wireless charging apparatus using a three-dimensional charging zone and, more particularly, an apparatus for constructing a wireless charging environment to improve an efficiency of wireless charging performed by an electronic device.

2. Description of Related Art

With increases of users using portable smartphones, the smartphones have been developed to provide various functions such as an Internet browser, a camera, and an application to satisfy various desires of the users.

Functions may be provided as various applications for user conveniences. When a user executes the functions in the smartphone, a battery included in the smartphone may be discharged. Thus, the user may charge the battery to continuously use the function in the smartphone. In general, the user may use an adapter connected to a charging terminal of the smartphone to charge the battery. Recently, according to a commercialization of wireless charging technology for charging a battery in lieu of using an adapter for charging the battery, the user may conveniently charge the battery without need to use the adapter.

The wireless charging technology may be technology for charging a battery of a smartphone using a transmitting resonator and a receiving resonator included in each of the smartphone and a wireless charging apparatus. The transmitting resonator and the receiving resonator may operate in a wireless a small electronic device such as a smartphone and a wireless charging apparatus. Thus, sizes of the transmitting resonator and the receiving resonator may be reduced such that the transmitting resonator and the receiving resonator are provided in sufficiently small sizes.

The reduced sizes of the transmitting resonator and the receiving resonator have allowed the transmitting resonator and the receiving resonator to be readily installed in the smartphone and the wireless charging apparatus. However, according to decreases in the sizes of transmitting resonator and the receiving resonator, a transmission distance through which a current flows may also be reduced and thus, the transmitting resonator and the receiving resonator may be used under a condition of spatial restrictions in practice. When a diameter of a receiving resonator is D, it is difficult to design and manufacture the receiving resonator that provides a transmission distance of at least 80% radio frequency (RF) efficiency at a level corresponding to the diameter of the receiving diameter simultaneously with realize the receiving resonator in a sufficiently small size.

Also, even if it is possible to develop such resonator, a transmission distance of the resonator may be limited to a diameter of the resonator.

To solve this, magnetic resonance-based wireless charging technology has been suggested. In general, the magnetic resonance-based wireless charging technology may have a characteristic of medium-range transmission performed in about one meter and a diameter of a resonator may correspond to a maximum transmission distance. Thus, there has been an effort to expand the transmission distance.

In addition to the aforementioned issue, a transmission distance limit may exist in a magnetic resonance method based on a combination of resonance modes. In view of most of research results, papers, and patent of related arts, a diameter of a resonator may be recognized as a most practical transmission distance in general. As another condition, the wireless power transmission may be available in only a predetermined area including a transmitting resonator.

Also, despite an equal transmission distance, an efficiency may vary based on a distance between the transmitting resonator and the receiving resonator and the efficiency may be susceptible to a direction. For example, when the transmitting resonator and the receiving resonator are disposed to face each other, the efficiency may be maintained to be maximized. In contrast, when the receiving resonator is disposed at angle of 45° or 90°, the efficiency may significantly decrease.

Accordingly, there is a desire for a method of efficiently transmitting wireless power based on transmission distance and direction of a wireless charging.

SUMMARY

An aspect provides wireless charging and energy transmitting technology having an increased degree of freedom in a three-dimensional (3D) area to expand a range of wireless power transmission in a process of performing wireless charging when compared to a pad structure corresponding to a two-dimensional (2D) area.

Another aspect also provides a structure of resonance coil for realizing a method of transmitting wireless power based on a 3D wireless charging zone.

According to an aspect, there is provided a wireless charging apparatus including a plurality of transmitting coils included in a wireless charging zone in a 3D form and at least one power source configured to supply a current to the plurality of transmitting coils, wherein the plurality of transmitting coils includes at least one pair of transmitting coils arranged to face each other in the wireless charging zone.

The at least one pair of transmitting coils may be configured to form a quiet zone in the wireless charging zone using the current supplied from the at least one power source.

The at least one pair of transmitting coils may be configured to form a quiet zone in a direction the same as a direction of at least one receiving coil present in the wireless charging zone.

The direction of the at least one receiving coil may be a direction in which an induced current is formed on the receiving coil through a coupling with one of the plurality of transmitting coils included in the wireless charging zone.

The at least one power source may be configured to supply currents to the at least one pair of transmitting coils such that phases of the currents differ by 90 degrees.

The at least one power source may be configured to supply an in-phase current or an out-of-phase current to the plurality of transmitting coils included in the wireless charging zone.

The wireless charging apparatus may further include at least one capacitor configured to reduce sizes of the plurality of transmitting coils or reduce resonant frequencies of the transmitting coils.

The at least one capacitor may be located between the at least one power source and the plurality of transmitting coils.

The at least one power source may include an inverter configured to control a phase of the current supplied to the plurality of transmitting coils.

The inverter may be configured to control the phase of the current supplied to the plurality of transmitting coils based on gradients between the transmitting coils and a receiving coil present in the wireless charging zone or a location of the receiving coil.

The current may have a difference in phase between the at least one pair of transmitting coils in the wireless charging zone or includes at least two phases having the same phase.

The wireless charging apparatus may further include a communicator configured to detect an induced current formed on the plurality of transmitting coils in the wireless charging zone.

The inverter may be configured to control a phase of a current initially set to be supplied to the plurality of transmitting coils based on the induced current detected by the communicator.

According to another aspect, there is also provided a wireless charging apparatus including at least one pair of transmitting coils arranged to face each other in a wireless charging zone in a 3D form, a power source including an inverter configured to control a phase of a current supplied to the at least one pair of transmitting coils, at least one capacitor configured to reduce sizes of the at least one pair of transmitting coils or reduce resonant frequencies of the at least one pair of transmitting coils, and a communicator configured to detect an induced current formed on at least one pair of transmitting coils present in the wireless charging zone.

The at least one pair of transmitting coils may be configured to form a quiet zone in the wireless charging zone using the current supplied from the power source.

The at least one pair of transmitting coils may be configured to form a quiet zone in a direction the same as a direction of at least one receiving coil present in the wireless charging zone.

The at least one power source may be configured to supply an in-phase current or an out-of-phase current to the at least one pair of transmitting coils arranged in the wireless charging zone.

The inverter may be configured to control a phase of a current supplied to the at least one pair of transmitting coils based on gradients between the at least one pair of transmitting coils and a receiving coil present in the wireless charging zone or a location of the receiving coil.

The current may have a difference in phase between the at least one pair of transmitting coils arranged in the wireless charging zone or includes at least two phases having the same phase.

The inverter may be configured to control a phase of a current initially set to be supplied to the at least one pair of transmitting coils based on the induced current detected by the communicator.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 1 is a diagram illustrating a wireless charging apparatus using a three-dimensional (3D) wireless charging zone according to an example embodiment;

FIG. 15 is a flowchart illustrating an operation performed by a processor of a wireless charging apparatus according to an example embodiment.

DETAILED DESCRIPTION

Figure 2A:
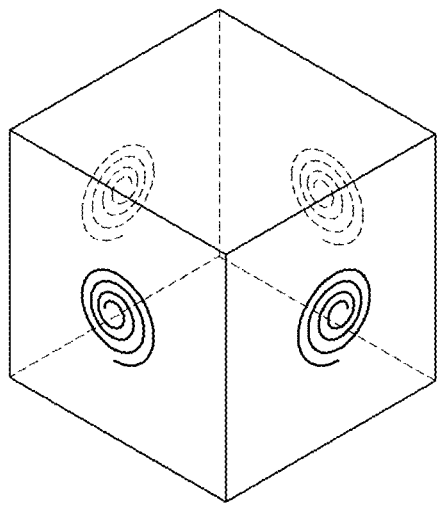
FIGS. 2A through 2C are diagrams illustrating transmitting coils arranged in a wireless charging zone according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

FIG. 1 is a diagram illustrating a wireless charging apparatus using a three-dimensional (3D) wireless charging zone according to an example embodiment.

Referring to FIG. 1, a wireless charging apparatus 101 may be located in a 3D wireless charging zone 106 to perform a wireless charging of an electronic device present in the 3D wireless charging zone 106. The wireless charging apparatus 101 may include transmitting coils 102, 103, 104, and 105 arranged in the 3D wireless charging zone 106 and power sources 108 and 109 configured to supply currents to the transmitting coils 102, 103, 104, and 105. The wireless charging apparatus 101 may use the transmitting coils 102, 103, 104, and 105 and the power sources 108 and 109 to form an energy zone for wireless charging based on the 3D wireless charging zone 106. For example, the wireless charging apparatus 101 may form magnetic fields on the transmitting coils 102, 103, 104, and 105 arranged in the 3D wireless charging zone 106. In this example, the 3D wireless charging zone 106 may be an energy zone formed based on a quiet zone of the magnetic fields formed on the transmitting coils 102, 103, 104, and 105. The quiet zone may indicate a magnetic field having an equalized energy density corresponding to each of the magnetic fields formed on the transmitting coils 102, 103, 104, and 105. The quiet zone may indicate a region in which the magnetic fields are densely formed between the transmitting coils 102, 103, 104, and 105 arranged in parallel in the 3D wireless charging zone 106 and an energy density of the magnetic fields is equalized.

The transmitting coils 102, 103, 104, and 105 may be arranged in various locations based on a structure in which the 3D wireless charging zone 106 is realized. For example, in terms of a structure in a cylindrical shape or a quadrangular shape, the transmitting coils 102, 103, 104, and 105 may be arranged in various locations such as a wall, a ceiling, a floor, and a corner of the structure. Related descriptions will also be provided with reference to FIGS. 2A and 2B.

Also, the transmitting coils 102, 103, 104, and 105 arranged in the 3D wireless charging zone 106 may include at least one pair of transmitting coils arranged to face each other in the 3D wireless charging zone 106. In this example, the transmitting coils 102, 103, 104, and 105 may be provided as a plurality of pairs of transmitting coils. For example, the wireless charging apparatus 101 may arrange four transmitting coils on each side of the 3D wireless charging zone 106 provided in a form of square. Each of the four transmitting coils may be paired with a counterpart transmitting coil in the 3D wireless charging zone 106.

In the 3D wireless charging zone 106, at least one pair of transmitting coil facing each other may form a quite zone and compose a predetermined energy density using the formed quite zone, thereby improving an efficiency of an energy generated in a predetermined space.

The transmitting coils 102, 103, 104, and 105 may form the magnetic fields using the currents supplied from the power sources 108 and 109. Each of the transmitting coils 102, 103, 104, and 105 may receive the current from the same one or a different one between the power sources 108 and 109. For example, when arranging the transmitting coils 102, 103, 104, and 105 in the 3D wireless charging zone 106, the wireless charging apparatus 101 may arrange two pairs of transmitting coils, a pair of the transmitting coils 103 and 105 and a pair of the transmitting coils 102 and 104.

The pair of the transmitting coils 103 and 105 and the pair of the transmitting coils 102 and 104 may form a fine quiet zone when the current supplied to the power sources 108 and 109 has phases differing by 90 degrees. Thus, a different in phase between the current supplied to the transmitting coils 103 and 105 and the current supplied to the transmitting coils 102 and 104 may be 90 degrees. In this disclosure, a current having the same phase may also be referred to as, for example, an in-phase current and a current having different phases may also be referred to as, for example, an out-of-phase current.

The pair of the transmitting coils 103 and 105 may receive the current from the power source 108 and the pair of transmitting coils 102 and 104 may receive the current from the power source 109. The transmitting coils 102, 103, 104, and 105 may be connected to different power sources or the same power source to receive currents. Also, the power sources 108 and 109 may transmit a preset current to the transmitting coils 102, 103, 104, and 105.

The wireless charging apparatus 101 may detect weather a receiving coil 107 is present in the 3D wireless charging zone 106. The wireless charging apparatus 101 may recognize an electronic device including the receiving coil 107 and verify whether the receiving coil 107 is present. For example, the wireless charging apparatus 101 may detect the electronic device including the receiving coil 107 in the 3D wireless charging zone based on a location-based communication technology. The location-based communication technology may include, for example, near-field communication (NFC), Bluetooth, and a wireless fidelity (Wi-Fi).

The wireless charging apparatus 101 may detect an induced current formed on the receiving coil 107 coupled with at least one transmitting coil based on the receiving coil 107 in the 3D wireless charging zone 106. For example, a coupling with the receiving coil 107 may occur by the quiet zone formed on at least one of the transmitting coils 102, 103, 104, and 105 arranged in the 3D wireless charging zone 106, and the wireless charging apparatus 101 may detect the induced current formed on the receiving coil 107 with which the coupling occurs.

The induced current formed on the receiving coil 107 may be a current induced through the coupling with the receiving coil 107 by the quiet zone formed on the transmitting coils 102, 103, 104, and 105 based on the preset current supplied from the power sources 108 and 109. Also, the induced current formed on the receiving coil 107 may have a value of current varying based on a change in location of the receiving coil 107 in the 3D wireless charging zone 106.

The wireless charging apparatus 101 may change the phase of the current supplied to the transmitting coils 102, 103, 104, and 105 based on the induced current of the receiving coil 107 detected to correspond to a location of the receiving coil 107 in the 3D wireless charging zone 106. For example, the wireless charging apparatus 101 may change a phase of a current generated in a power source to a phase of a current previously set in the power source to correspond to an induced current between the receiving coil 107 and the transmitting coils 102, 103, 104, and 105. Also, the power sources 108 and 109 may supply the current having the changed phase to the transmitting coils 102, 103, 104, and 105.

Thereafter, the wireless charging apparatus 101 may redetect an induced current formed on the receiving coil 107 by the quite zone formed on the transmitting coils 102, 103, 104, and 105 based on the current having the changed phase. Also, when the redetected induced current is in a normal state, the wireless charging apparatus 101 may maintain a phase of the induced current and perform charging of the electronic device including the receiving coil 107. By supplying the current having different phases based on the location of the receiving coil 107 in the 3D wireless charging zone 106 to the transmitting coils 102, 103, 104, and 105 the wireless charging apparatus 101 may perform the charging without restrictions associated with the 3D wireless charging zone 106. Here, the normal state may be a state based on whether an amount of wireless power for charging a battery of the electronic device including the receiving coil 107 is sufficient to charge the battery.

Wireless charging technology using the wireless charging apparatus 101 may be applicable to various devices, for example, a pad-type device such as a smartphone, and may exert significant influence on activations of wearable devices and Internet of things (IoT) devices. Also, the wireless charging technology using the wireless charging apparatus 101 may allow automatic charging of small wearable devices which may be difficult to be charged using a wire and to change a battery while the small wearable devices are located in a predetermined space so as to provide a convenience to a user.

When an electronic device enters in the 3D wireless charging zone 106 having X, Y, Z axes, a battery of the electronic device may be automatically charged through resonances between a receiving coil included in the electronic device and transmitting coils arranged on one of the X, Y, Z axes of the 3D wireless charging zone 106 based on a wireless transmission method of a predetermined space.

Figure 2B:
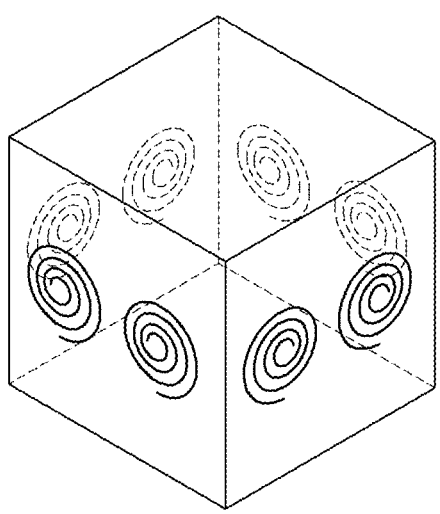
Figure 2C:
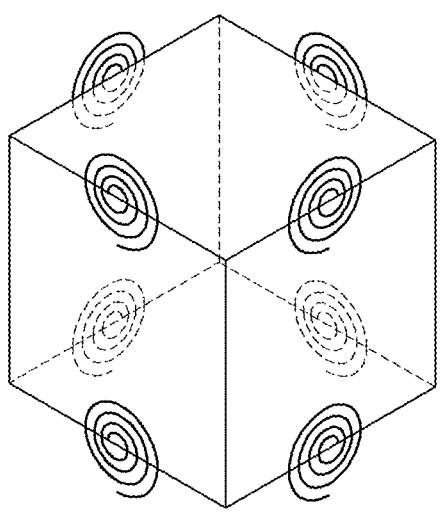

FIGS. 2A through 2C are diagrams illustrating transmitting coils arranged in a wireless charging zone according to an example embodiment.

Referring to FIGS. 2A through 2C, transmitting coils may be disposed at various locations in a wireless charging zone. The transmitting coils may form a quiet zone on the wireless charging zone using a current supplied from at least one power source.

Referring to FIG. 2A, the transmitting coils may be disposed on a wall, a ceiling, and a floor of the wireless charging zone. In this example, the transmitting coils may be disposed on a wall and a ceiling to face one another and also be disposed on walls facing each other.

Referring to FIG. 2B, the transmitting coils may be disposed on four walls of the wireless charging zone. In this example, at least one transmitting coil may be disposed on one wall such that an area of a quiet zone formed around the at least one transmitting coil is expanded. FIG. 2B may be of a concept extended from a configuration of forming a quiet zone using a single transmitting coil. In an example of FIG. 2B, a plurality of transmitting coils may be arranged in consideration of a case in which an area of the wireless charging zone is relatively large, or a relatively strong current is required.

Referring to FIG. 2C, the transmitting coils may be disposed at corners of the ceiling or corners of the floor in the wireless charging zone. In this example, the transmitting coils arranged in the 3D wireless charging zone may be arranged in various forms in addition to the aforementioned examples of FIGS. 2A through 2C. In this disclosure, a structure of connecting a pair of transmitting coils in parallel and a structure of connecting a pair of transmitting coils in series may be provided in an arrangement of the transmitting coils. Also, the resonance may be autonomously performed between the transmitting coils or an additional cap may be used to perform the resonance between the transmitting coils.

Figure 3A:
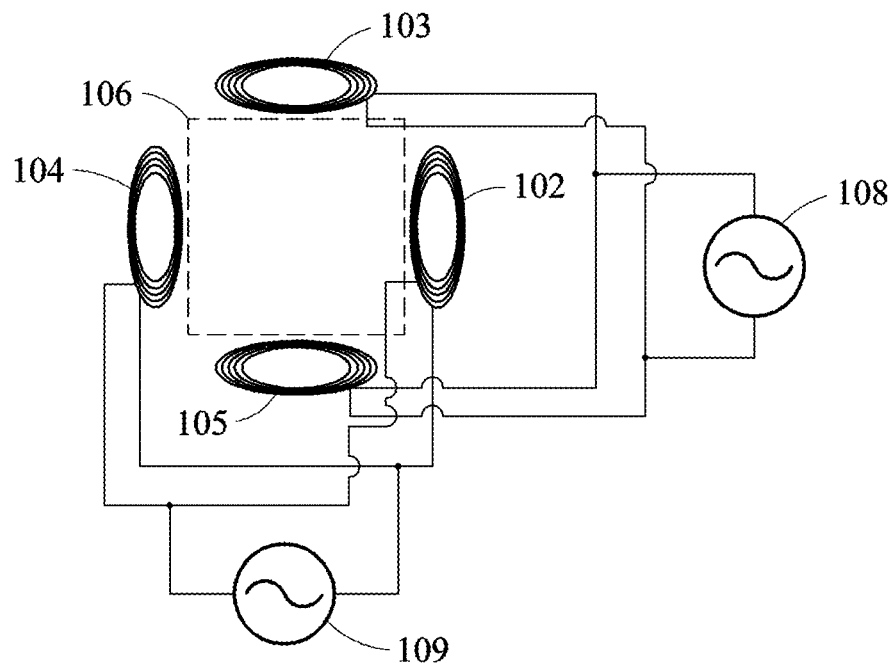
FIGS. 3A and 3B are diagrams illustrating transmitting coils and a quite zone formed on the transmitting coils according to an example embodiment.
Figure 3B:
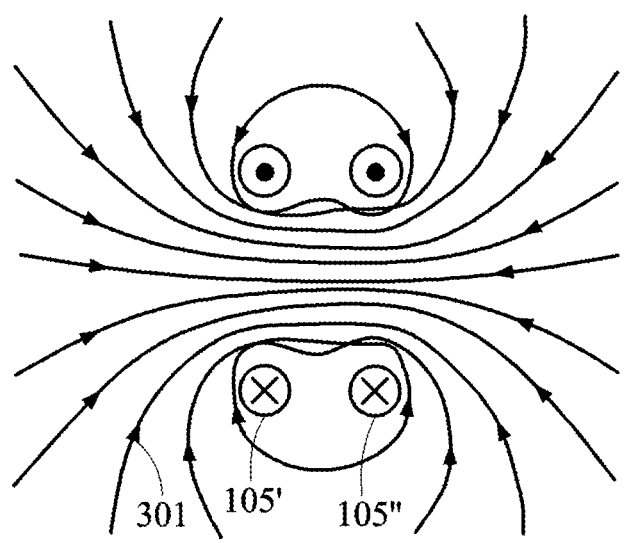

FIGS. 3A and 3B are diagrams illustrating transmitting coils and a quite zone formed on the transmitting coils according to an example embodiment.

FIG. 3A illustrates the transmitting coils 102, 103, 104, and 105 included in the 3D wireless charging zone 106. As illustrated in FIG. 3A, a wireless charging apparatus may include a plurality of transmitting coils, for example, the transmitting coils 102, 103, 104, and 105 and at least one power source, for example, the power sources 108 and 109.

The transmitting coils 102, 103, 104, and 105 may be arranged in the 3D wireless charging zone 106. In the 3D wireless charging zone 106, at least one pair of transmitting coils may be arranged to face each other. Here, an arrangement structure of the 3D wireless charging zone 106 may be a structure in which the transmitting coils 102, 103, 104, and 105 are arranged in each interval corresponding to a predetermined size of area in the 3D wireless charging zone 106 such that the transmitting coils 102, 103, 104, and 105 maintain a predetermined level of efficiency in each interval of the 3D wireless charging zone 106.

The arrangement structure may be for constantly receiving an induced current irrespective of a location of a receiving coil when the receiving coil is present in an area as indicated by a box with a dashed line. For example, the transmitting coils 102, 103, 104, and 105 corresponding to the at least one pair of transmitting coils arranged to face each other may form a quite zone in the 3D wireless charging zone 106 using a current supplied from the power sources 108 and 109.

In this example, the power sources 108 and 109 may control the current to flow in the same direction to the at least one pair of transmitting coils facing each other such that the quiet zone is formed in the 3D wireless charging zone between the pair of transmitting coils. In response to the controlled current being received by the transmitting coils 102, 103, 104, and 105, a magnetic field having a predetermined wavelength may be formed between the transmitting coils arranged as a pair.

Through this, in the 3D wireless charging zone 106, a charging area in which an energy density is constantly maintained by the quite zone formed by the transmitting coils 102, 103, 104, and 105 may be provided. In this example, the transmitting coils 102, 103, 104, and 105 may be realized as at least one pair of transmitting coils arranged to face each other and a quiet zone may be densely formed between the transmitting coils realized as a pair. Accordingly, a magnetic field having an energy density in a more equalized state may be formed.

Thereafter, the receiving coil may be located in the 3D wireless charging zone 106 having an equalized energy density and thus, may receive an equal induced current from the transmitting coils 102, 103, 104, and 105 irrespective of a location of the receiving coil.

In FIG. 3A, a pair of the transmitting coils 102 and 104 may horizontally form the quite zone, and a pair of the transmitting coils 103 and 105 may vertically form the quite zone. The power source 109 connected to the transmitting coils 102 and 104 and the power source 108 connected to the transmitting coils 103 and 105 may output an in-phase current. In an example of FIG. 3A, a phase of the current supplied to the transmitting coils 103 and 105 may be different from a phase of the current supplied to the transmitting coils 102 and 104. In other words, an operation of adjusting an equalized magnetic field in the 3D wireless charging zone may be performed to provide a normal charging function to the receiving coil located in the 3D wireless charging zone. When the transmitting coils 102, 103, 104, and 105 are arranged on four walls of the 3D wireless charging zone, the pair of the transmitting coils 103 and 105 may be set to receive the in-phase current and the pair of the transmitting coils 102 and 104 may be set to receive the out-of-phase current.

The phase of the current supplied to the transmitting coils 103 and 105 may be set to be different from the phase of the current supplied to the transmitting coils 102 and 104 such that a different in phase of 90 degrees occurs in the currents supplied to the transmitting coils 102, 103, 104, and 105. For example, the phase of the current supplied to the transmitting coils 103 and 105 may be zero degrees and the phase of the current supplied to the transmitting coils 102 and 104 may be 90 degrees. In this example, the phase of the current supplied to the transmitting coils 103 and 105 may differ from the phase of the current supplied to the transmitting coils 102 and 104 by 90 degrees.

Accordingly, a difference between a minimum current value and a maximum current value may be reduced when the transmitting coils 103 and 105 and the transmitting coils 102 and 104 receive a 90-degree out-of-phase current in comparison to the in-phase current and thus, a density of the quite zone formed in the 3D wireless charging zone may increase.

FIG. 3B illustrates between transmitting coils arranged as a pair, a form of a quite zone formed between the transmitting coils, and a location based on a connection between the transmitting coils.

A wireless charging apparatus may supply a current flowing in the same direction to the transmitting coils 105' and 105" arranged as a pair. Also, the wireless charging apparatus may allow a quite zone to be formed in an area in which a distribution of a magnetic field is indicated by dotted lines, that is, the 3D wireless charging zone 106 by a current supplied to the transmitting coils 105' and 105" arranged as the pair.

FIG. 3B may be based on a concept extended from an example of FIG. 3A. By arranging a plurality of transmitting coils to be provided as a pair in a predetermined interval of the 3D wireless charging zone 106, the wireless charging apparatus may be implemented in a structure that increases the number of pairs of coils such that a quite zone is formed with respect to a receiving coil receiving a current from the transmitting coils although a direction of the receiving coil is rotated by 90 degrees.

Figure 4:
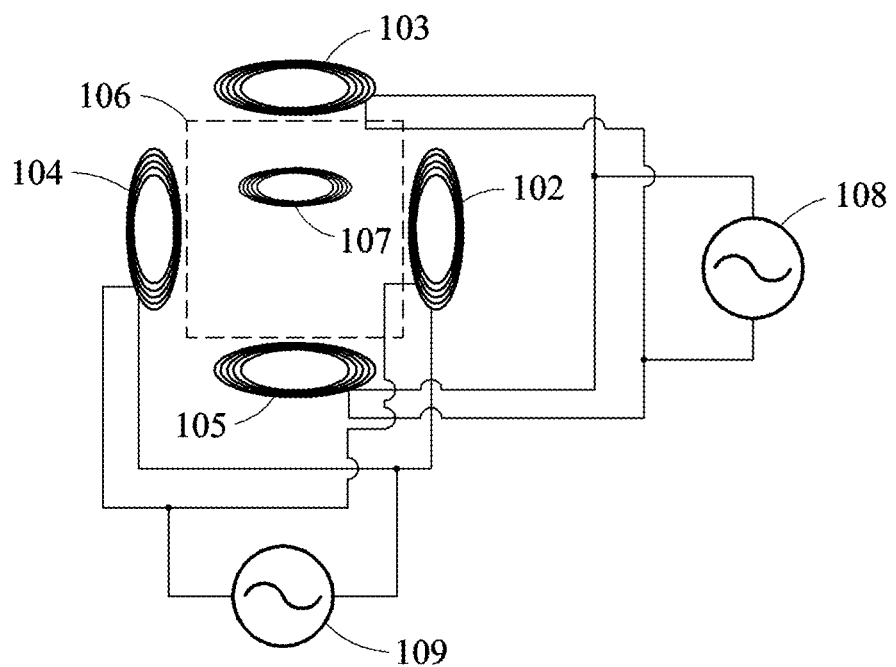
FIG. 4 is a diagram illustrating an example of an operation in which a coupling of a transmitting coil with a receiving coil occurs in a wireless charging zone according to an example embodiment.

FIG. 4 is a diagram illustrating an example of an operation in which a coupling of a transmitting coil with a receiving coil occurs in a wireless charging zone according to an example embodiment.

Referring to FIG. 4, in response to a coupling occurring between one of the transmitting coils 102, 103, 104, and 105 and the receiving coil 107 located in the 3D wireless charging zone 106, a wireless charging apparatus may form an induced current on the receiving coil 107. In this example, the wireless charging apparatus may form the quite zone in a direction the same as a direction of at least one receiving coil, the receiving coil 107 located in the 3D wireless charging zone 106.

The wireless charging apparatus may determine a direction corresponding to a location of the receiving coil 107 in the 3D wireless charging zone 106. The wireless charging apparatus may form a quite zone in a direction the same as the determined direction of the receiving coil 107.

For example, the receiving coil 107 may be vertically disposed in the 3D wireless charging zone 106, and located adjacent to the transmitting coil 103 among the transmitting coils 102, 103, 104, and 105. In this example, the wireless charging apparatus may vertically form the quite zone using the transmitting coils 103 and 105. Since the receiving coil 107 is located in a vertical direction in the 3D wireless charging zone 106, the receiving coil 107 may be connected to the transmitting coils 103 and 105 forming a magnetic field in a vertical axis direction. The transmitting coils 103 and 105 may receive most of the current from the power source 108.

Also, the induced current may be formed on the receiving coil 107 through a resonance between the receiving coil 107 and the transmitting coil 103 having a higher coupling coefficient between the transmitting coils 103 and 105. In other words, when the receiving coil 107 is coupled with one of a plurality of transmitting coils, the induced current may be formed by a transmitting coil located adjacent to the receiving coil 107. For example, a magnetic field may be formed on the receiving coil 107 by a quite zone formed on the transmitting coil 103, and an induced current may be formed based on the magnetic field.

Figure 5:
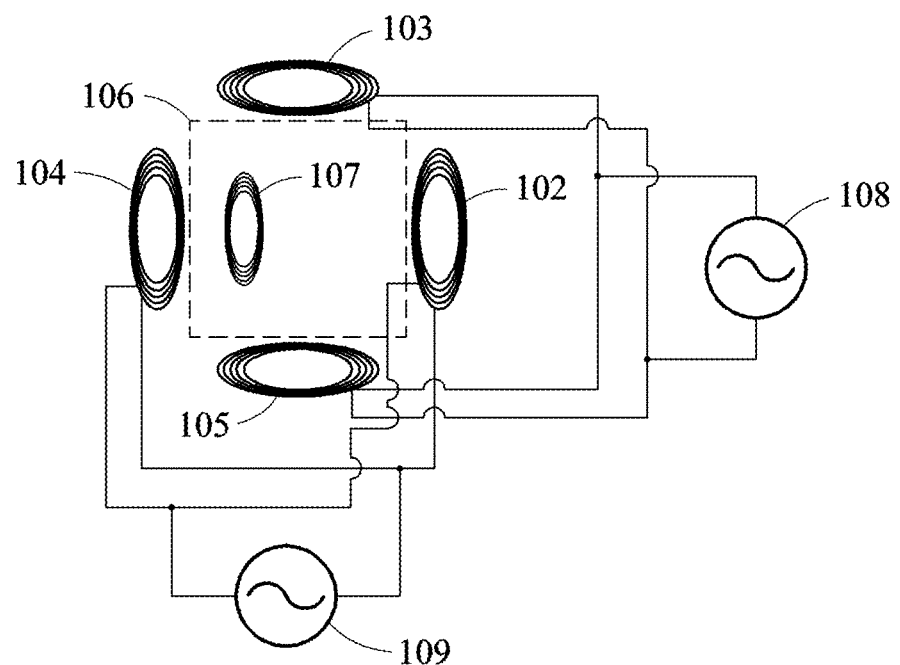
FIG. 5 is a diagram illustrating another example of an operation in which a coupling of a transmitting coil and a receiving coil occurs in a wireless charging zone according to an example embodiment.

FIG. 5 is a diagram illustrating another example of an operation in which a coupling of a transmitting coil and a receiving coil occurs in a wireless charging zone according to an example embodiment.

Referring to FIG. 5, in response to a coupling occurring between one of the transmitting coils 102, 103, 104, and 105 and the receiving coil 107 located in the 3D wireless charging zone 106, a wireless charging apparatus may form an induced current on the receiving coil 107. In this example, the wireless charging apparatus may form the quite zone in a direction the same as a direction of at least one receiving coil, the receiving coil 107 located in the 3D wireless charging zone 106.

The wireless charging apparatus may determine a direction corresponding to a location of the receiving coil 107 in the 3D wireless charging zone 106. The wireless charging apparatus may form a quite zone in a direction the same as the determined direction of the receiving coil 107.

For example, the receiving coil 107 may be horizontally disposed in the 3D wireless charging zone 106, and located adjacent to the transmitting coil 104 among the transmitting coils 102, 103, 104, and 105. In this example, the wireless charging apparatus may horizontally form the quite zone using the transmitting coils 102 and 104. Since the receiving coil 107 is located in a horizontal direction in the 3D wireless charging zone 106, the receiving coil 107 may be connected to the transmitting coils 102 and 104 forming a magnetic field in a horizontal axis direction. The transmitting coils 102 and 104 may receive most of the current from the power source 109.

Also, the induced current may be formed on the receiving coil 107 through a resonance between the receiving coil 107 and the transmitting coil 103 having a higher coupling coefficient between the transmitting coils 102 and 104. For example, a magnetic field may be formed on the receiving coil 107 by a quite zone formed on the transmitting coil 104, and an induced current may be formed based on the magnetic field.

Figure 6:
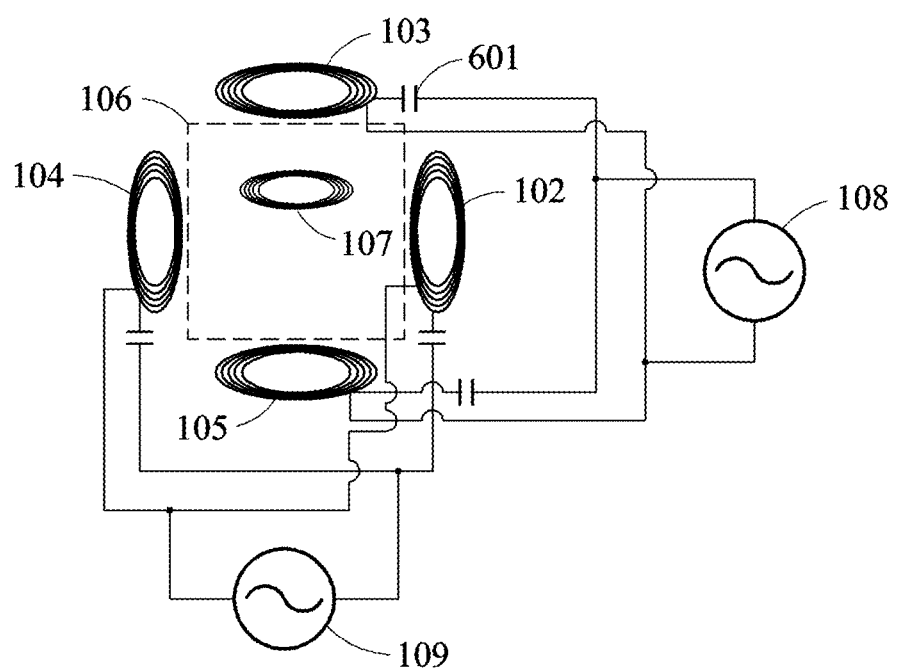
FIG. 6 is a diagram illustrating a transmitting coil including a capacitor according to an example embodiment.

FIG. 6 is a diagram illustrating a transmitting coil including a capacitor according to an example embodiment.

Referring to FIG. 6, a wireless charging apparatus may further include at least one capacitor 601 configured to reduce sizes of the transmitting coils 102, 103, 104, and 105 or reduce resonance frequencies of the transmitting coils 102, 103, 104, and 105. The at least one capacitor 601 may be located between at least one power source and the transmitting coils 102, 103, 104, and 105. The resonance frequencies of the transmitting coils 102, 103, 104, and 105 connected to the at least one capacitor 601 may be reduced by the at least one capacitor 601.

For example, the transmitting coils 102, 103, 104, and 105 may form a quite zone based on a resonance frequency corresponding to a current supplied from a power source in general. In this example, the current supplied from the power source to the transmitting coils 102, 103, 104, and 105 connected to the at least one capacitor 601 may be filtered by the at least one capacitor and thus, the resonance frequency corresponding to the current may be reduced.

Figure 7:
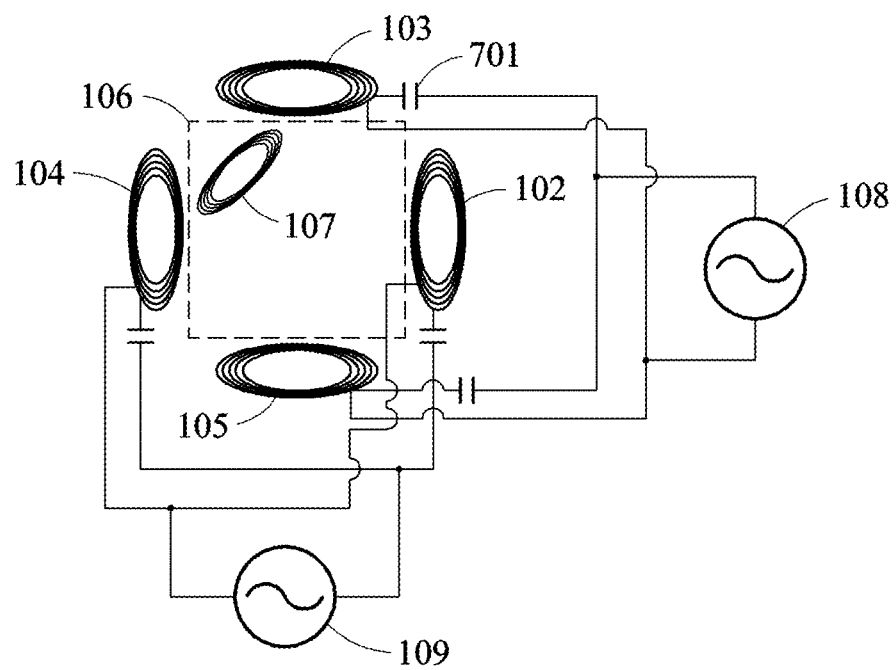
FIG. 7 is a diagram illustrating an operation of offsetting magnetic field formed on transmission coils arranged in a wireless charging zone according to an example embodiment.

FIG. 7 is a diagram illustrating an operation of offsetting magnetic field formed on transmission coils arranged in a wireless charging zone according to an example embodiment.

Referring to FIG. 7, the 3D wireless charging zone 106 may include an area in which a transmission of a quite zone formed by the transmitting coils 102, 103, 104, and 105 is unavailable. As illustrated in FIG. 7, when the receiving coil 107 is located at a corner of the 3D wireless charging zone 106, the quite zone formed by the transmitting coils 102, 103, 104, and 105 may not be transmitted to the receiving coil 107.

The foregoing example may be based on a case in which an offset occurs in a quite zone of at least one pair of transmitting coils. For example, a quite zone formed between the transmitting coils 102 and 104 and a quite zone formed between the transmitting coils 103 and 105 may be formed to cross each other and thus, an offset between the quite zones may occur. In this example, the area in which the transmission of the quite zone formed by the transmitting coils 102, 103, 104, and 105 is unavailable may be formed with respect to a predetermined area in the 3D wireless charging zone 106.

In this disclosure, by controlling a phase of a current supplied from a power source, an environment may be constructed such that a wireless charging is performed in any location of the 3D wireless charging zone 106 and an area in which a transmission of a quite zone is not formed. Related descriptions will be continuously provided with reference to FIGS. 8 through 10.

Figure 8:
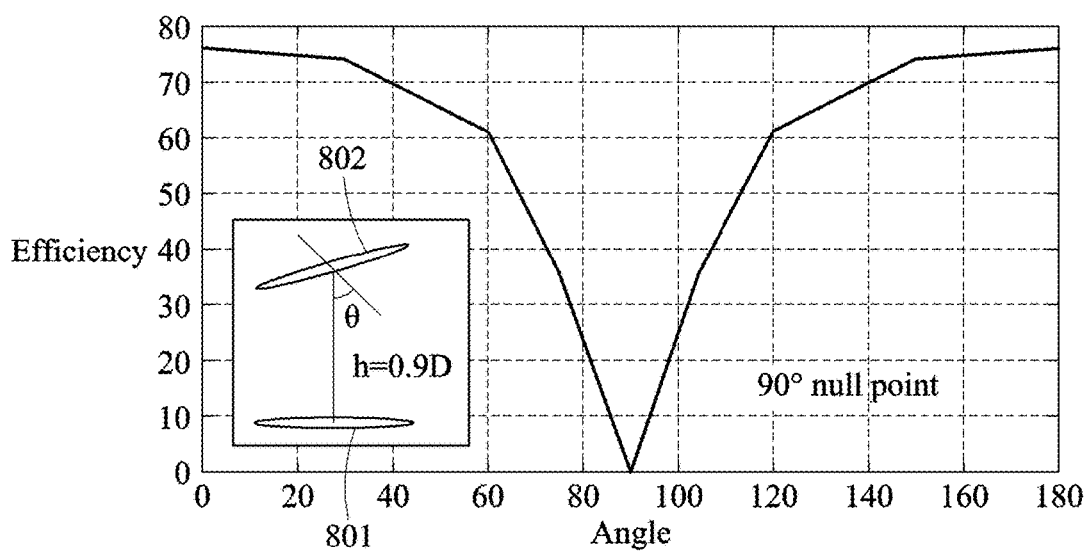
FIG. 8 is a graph illustrating a change in efficiency based on a gradient between a receiving coil and a transmitting coil according to an example embodiment.

FIG. 8 is a graph illustrating a change in efficiency based on a gradient between a receiving coil and a transmitting coil according to an example embodiment.

A graph of FIG. 8 represents a change in efficiency based on a gradient between a transmitting coil and a receiving coil 802. A wireless charging apparatus may operate in consideration of gradients between transmitting coils and the receiving coil located in a wireless charging zone.

As shown in the graph of FIG. 8, when transmitting coils are arranged on a floor 801 of the 3D wireless charging zone 106, and when the receiving coil 802 is disposed at an angle of θ, the wireless charging apparatus may have a minimum efficiency of energy transmission in an area in which the angle of θ is 90°.

Figures 9A, 9B:
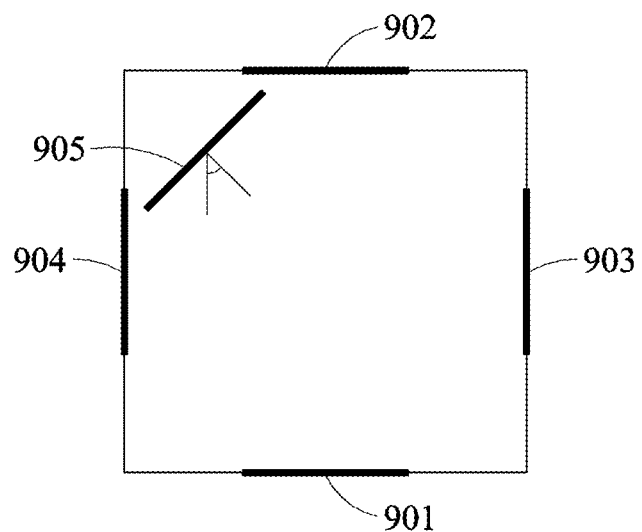
FIGS. 9A and 9B are diagrams illustrating a change in efficiency of the offset magnetic field of FIG. 7 according to an example embodiment.

FIGS. 9A and 9B are diagrams illustrating a change in efficiency of the offset magnetic field of FIG. 7 according to an example embodiment.

FIGS. 9A and 9B illustrate a case in which an energy efficiency decreases due to an offset occurring in a magnetic field described with reference to FIG. 7. For example, an efficiency of receiving an energy may be obtained through a simulation performed by varying an angle of a receiving coil 905 in a wireless charging zone. As a result of the simulation, as illustrated in FIGS. 9A and 9B, the receiving coil 905 may have a null point at an angle of θ, for example, −45°.

A null point phenomenon may be a phenomenon appears commonly at corners of a quadrangle structure and may occur due to an offset occurring between magnetic fields as described with reference to FIG. 7. In this disclosure, an issue of the offset occurring between the magnetic fields may be solved by controlling a phase of a current supplied from a power source.

Figure 10:
FIG. 10 is a diagram illustrating current characteristics based on a change in phase of a current supplied from a power source according to an example embodiment.

FIG. 10 is a diagram illustrating current characteristics based on a change in phase of a current supplied from a power source according to an example embodiment.

FIG. 10 illustrates efficiency change characteristics associated with a null point typically occurring when a 90-degree out-of-phase current is supplied to the transmitting coils 901 and 902 as described with reference to FIG. 9.

In terms of the efficiency change characteristic that a null point value is obtained at an angle of θ, for example, −45°, it is indicated that an efficiency of this system is improved when a phase of a current supplied to the transmitting coils 901 and 902 is changed in comparison to a phase of a current supplied to the transmitting coils 903 and 904. Thus, an issue associated with a null point value obtained at a predetermined location and a predetermined angle when an energy zone, that is, a wireless charging zone is formed in a cubic structure may be solved by changing a phase of a current supplied to a transmitting coil.

Accordingly, as described with reference to FIGS. 3A and 3B, a difference between a minimum current value and a maximum current value may be reduced when the transmitting coils 901 and 902 and the transmitting coils 903 and 904 receive a 90-degree out-of-phase current in comparison to the in-phase current and thus, a density of the quite zone formed in the 3D wireless charging zone may increase.

Figure 11A:
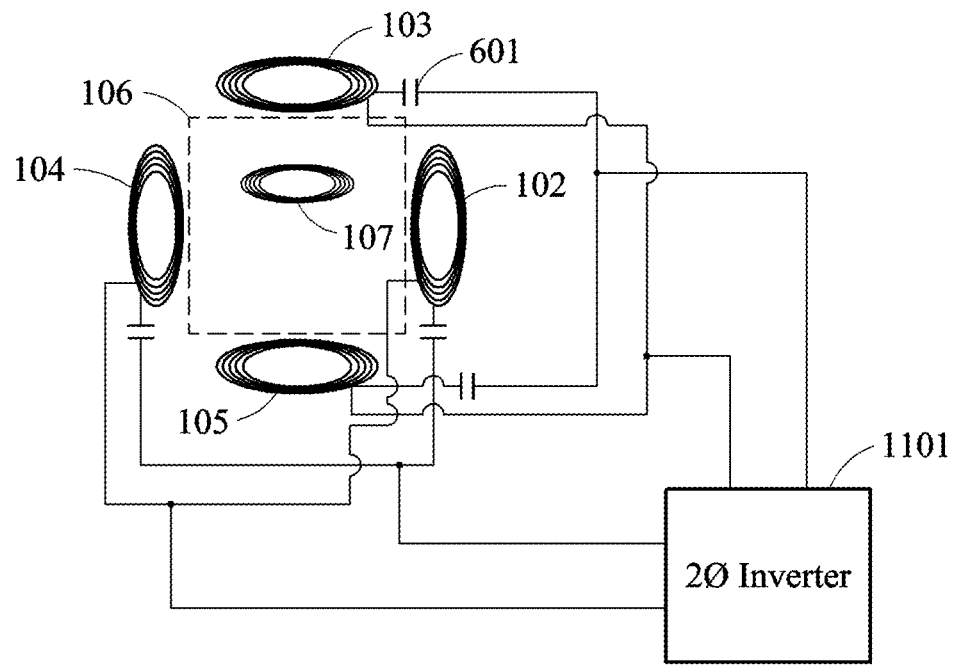
FIGS. 11A and 11B are diagrams illustrating an operation of controlling a phase of a magnetic field formed on transmission coils using an inverter included in a power source according to an example embodiment.
Figure 11B:
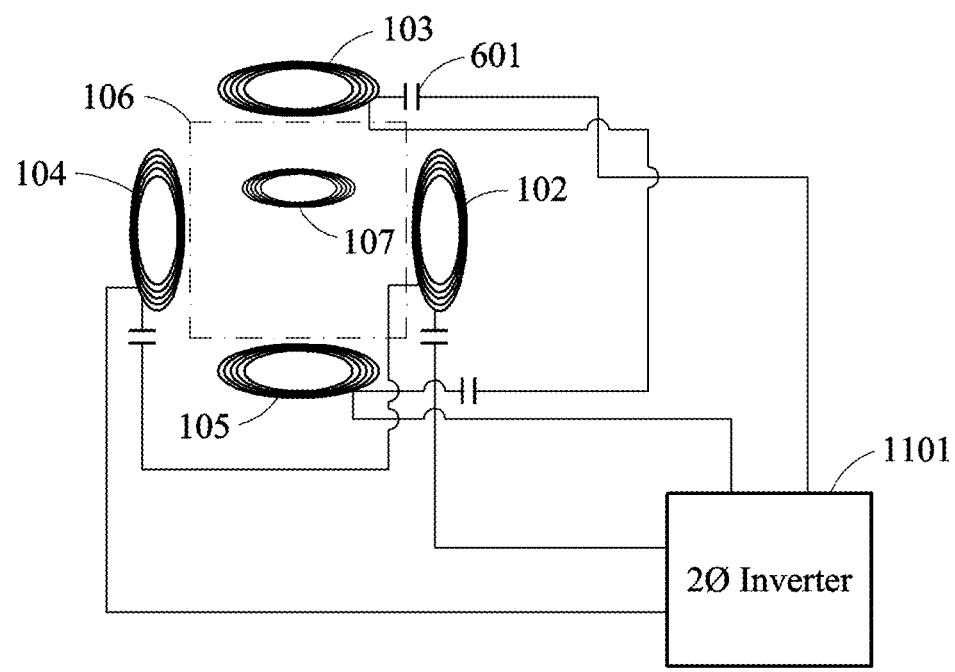
Figure 12A:
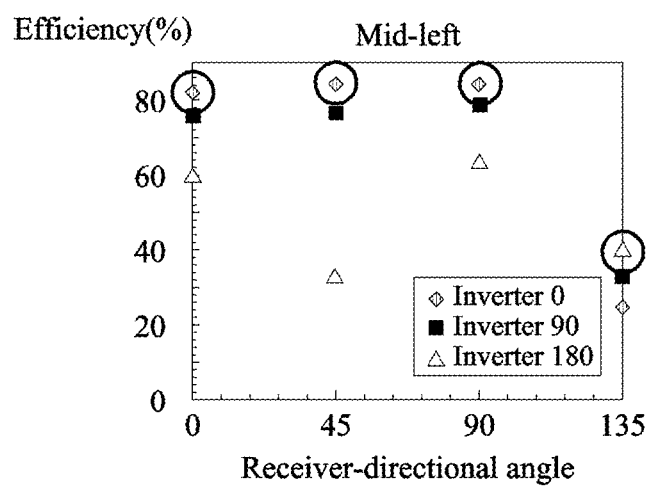
FIGS. 12A through 12E are diagrams illustrating results of evaluation on an efficiency of a wireless charging apparatus using a 3D wireless charging zone according to an example embodiment.
Figure 12B:
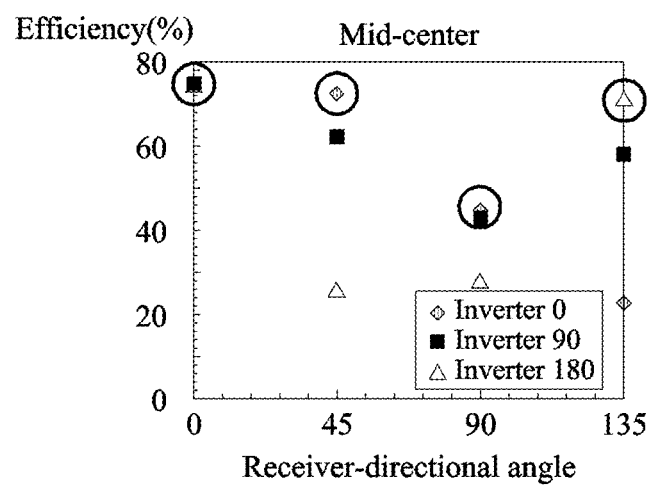
Figure 12C:
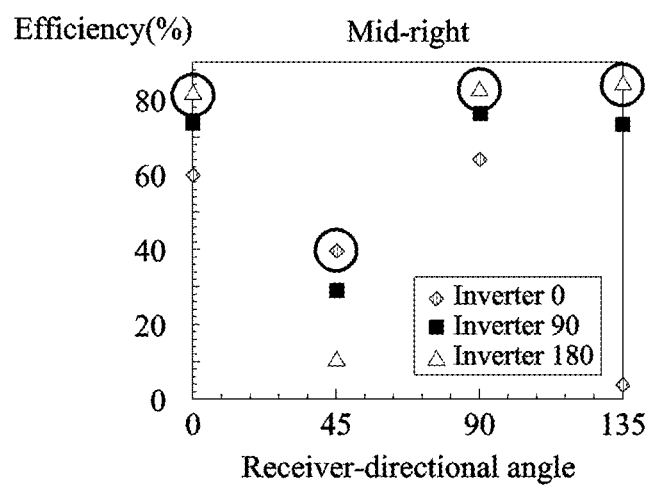
Figure 12D:
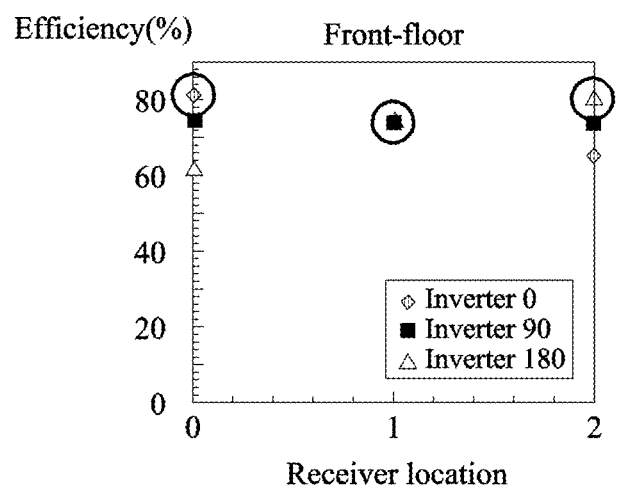
Figure 12E:
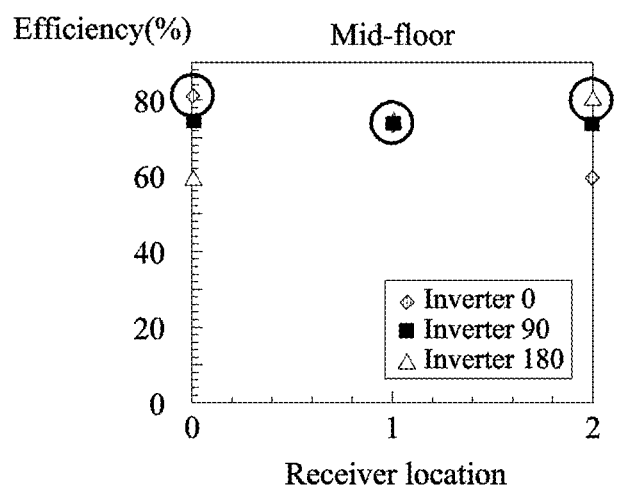

FIGS. 11A and 11B are diagrams illustrating an operation of controlling a phase of a magnetic field formed on transmission coils using an inverter included in a power source according to an example embodiment.

Referring to FIGS. 11A and 11B, a wireless charging apparatus may use one inverter, for example, an inverter 1101 to supply a current having two phase signals to the transmitting coils 102, 103, 104, and 105. Also, the transmitting coils 103 and 105, and the transmitting coils 102 and 104 may have different current phases based on the current supplied from the inverter 1101.

For example, a current including two signals having different phases may be generated in the inverter 1101. The current including the signals corresponding to the two phases may be fed to the transmitting coils 103 and 105 as an in-phase current. Also, with respect to the transmitting coils 102 and 104, feeding may be performed at the same phase between transmitting coils implemented as two pairs with a current of a signal having the other phase. Here, as a method of feeding a current to a transmitting coil, a direct feeding method may be used to directly feed a current to a transmitting coil and an indirect feeding method may also be used to feed a current to a transmitting coil. To perform the method, a feeding coil may be additionally provided in a structure. Also, an in-phase current or an out-of-phase current may be fed to a pair of transmitting coils and another pair of transmitting coils.

In this example, a location and an angle of the receiving coil 107 at which the null point occurs in the 3D wireless charging zone 106 may be verified. Also, in consideration of a point in time at which the null point occurs, the inverter 1101 may generate an in-phase current and feed the in-phase current to the transmitting coils 102, 103, 104, and 105.

Also, in response to the feeding the in-phase current to the transmitting coils 102, 103, 104, and 105, the point in time at which the null point occurs may disappear. That is, when the magnetic field is transferred to the point in time at which the null point occurs, the point in time at which the null point occurs may disappear.

In a case in which at least two receiving coils are provided, the number of transmitting coils may increase. In such case, by much densely defining the magnetic field formed on the transmitting coils 102, 103, 104, and 105, the issue of the null point occurring in a plurality of receiving coils may be solved.

The issue of the null point occurring in a plurality of receiving coils may also be solved using a method to power on/off through a time division of a resonance period formed in a receiving coil.

FIGS. 12A through 12E are diagrams illustrating results of evaluation on an efficiency of a wireless charging apparatus using a 3D wireless charging zone according to an example embodiment.

FIGS. 12A through 12E illustrate results of evaluation on an effectiveness of a wireless charging apparatus using a 3D wireless charging zone. Specifically, an actual prototype product associated with a wireless charging zone having a cubic structure of 30×30×30 cm³ may be manufactured to evaluate an effectiveness of the foregoing examples. A transmitting module manufactured for the evaluation may be an inverter formed in a switch amplifier structure to operate at a band of 300 kilohertz (kHz), and two inverters having a difference in phase may be used in the prototype product. A receiver may be configured as a full bridge-type rectifier circuit.

To evaluate an actual system, the evaluation may be performed through a measurement based on a direct current (DC)-to-DC efficiency. Transmitting coils may be arranged in various locations, for example, a middle left area, a middle area, a middle right area, a front part of a floor, and a middle part of the floor in the wireless charging zone, and the measurement may be performed based on a corresponding location. In each of the locations, the measurement may be performed by rotating the receiving coil by 0°, 45°, 90°, and 135°.

Also, the measurement may be performed by transitioning the inverter by 0°, 90°, and 180° at each rotational angle and each of the locations. As illustrated in FIGS. 12A through 12E, when one location and one rotational angle of the inverter is changed by 0°, 90°, and 180°, an optimal efficiency may be achieved and an issue that an efficiency decreases may be solved.

Figure 13A:
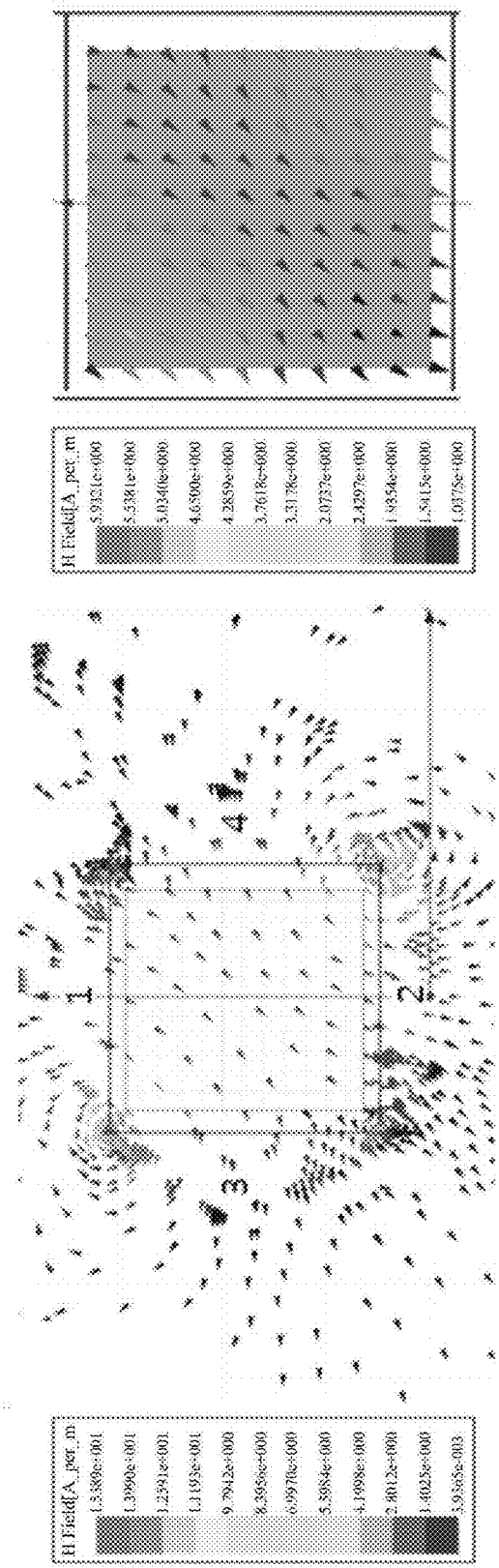
FIGS. 13A and 13B are diagrams illustrating a comparison between quite zones formed on transmitting coils arranged in a 3D wireless charging zone according to an example embodiment.
Figure 13B:
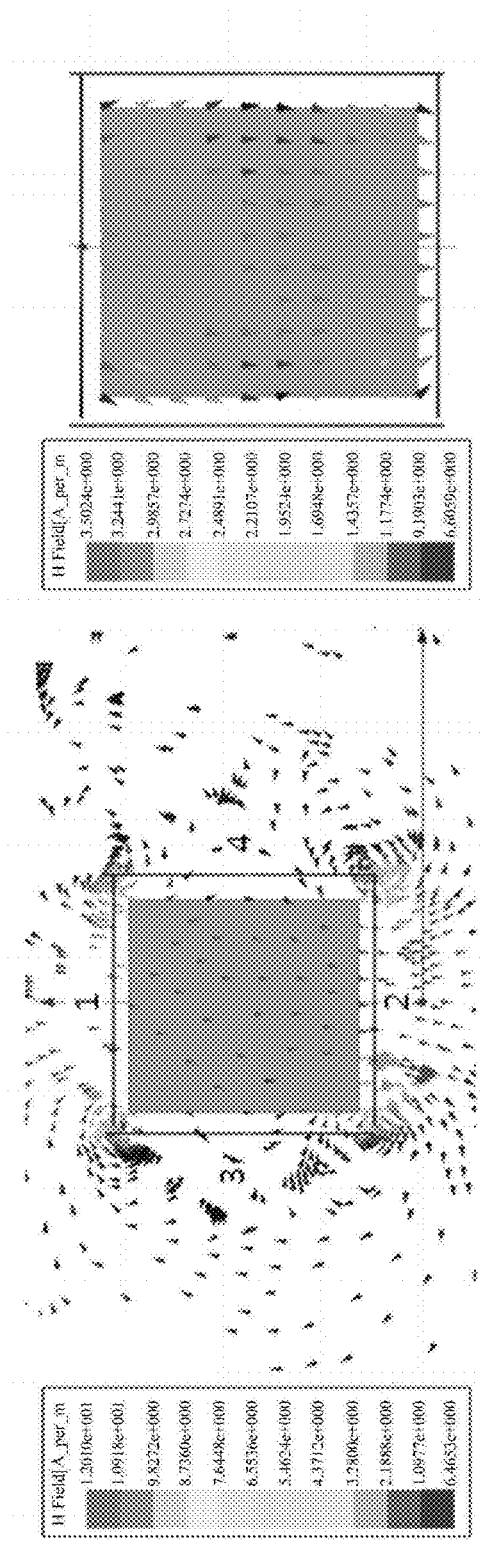

FIGS. 13A and 13B are diagrams illustrating a comparison between quite zones formed on transmitting coils arranged in a 3D wireless charging zone according to an example embodiment.

Referring to FIGS. 13A and 13B, a simulation may be performed on an operation of forming a quite zone having an equalized energy density in a wireless charging zone. In this example, to perform the simulation, an environment may be constructed to have a condition as further discussed below. For example, a cubic wireless charging zone may be formed. Also, transmitting coils may be arranged on four walls configuring the cubic wireless charging zone. The transmitting coils may be implemented as at least one pair of transmitting coils arranged to each other based on locations of the four walls. In an example of FIGS. 13A and 13B, a transmitting coil 1 and a transmitting coil 2 may be provided as a pair, and a transmitting coil 3 and a transmitting coil 4 may be provided as a pair.

An in-phase current may be supplied to the pair of transmitting coils 1 and 2 facing each other, and the in-phase current or a 90-degree out-of-phase current may be supplied to the pair of transmitting coils 3 and 4 facing each other. In this example, quite zones may be formed in the wireless charging zone and sizes of the quite zones may be compared.

In this disclosure, a simulation environment may be constructed such that the 1 ampere (A) current is applied from a porter to the pair of the transmitting coils 1 and 2 and the pair of the transmitting coils 3 and 4 through both in-phase feeding and 90°-phase-transitioned feeing. Also, a distribution of the quite zone obtained in the examples of FIGS. 13A and 14A to correspond to the pair of the transmitting coils 1 and 2 and the pair of the transmitting coils 3 and 4 receiving the 1 A current based on the simulation environment may be provided.

FIG. 13A illustrates a distribution of the quiet zones formed in the wireless charging zone in response to a 1 A current being applied to the two pairs of transmitting coils facing each other, for example, the pair of the transmitting coils 1 and 2 and the pair of the transmitting coils 3 and 4, through an in-phase feeding.

In an example of FIG. 13A, a 1 A in-phase current may be applied to the transmitting coils 1 and 2 and the transmitting coils 3 and 4. When a phase of a current set in a power source is zero degrees, a current having the same phase corresponding to zero degrees may be supplied to the transmitting coils 1 and 2 and the transmitting coils 3 and 4. Thus, the current may be supplied to the transmitting coils 1 and 2 and the transmitting coils 3 and 4 through the in-phase feeding.

The transmitting coils 1 through 4 may form quite zones in the wireless charging to zone based on the in-phase current. In the wireless charging zone, the quite zones may be provided in a form curved at a predetermined angle based on a phase of the in-phase current.

FIG. 13B illustrates a distribution of the quiet zones formed in the wireless charging zone in response to a 1 A current being applied to the two pairs of transmitting coils facing each other, for example, the pair of the transmitting coils 1 and 2 and the pair of the transmitting coils 3 and 4, through a 90-degree out-of-phase feeding.

In an example of FIG. 13B, a 1 A out-of-phase current may be applied to the transmitting coils 1 and 2 and the transmitting coils 3 and 4. In this example, a phase of the current supplied to the transmitting coils 1 and 2 may be controlled to be zero degrees and a phase of the current supplied to the transmitting coils 3 and 4 may be controlled to be 90 degrees. Also, the transmitting coils 1 and 2 and the transmitting coils 3 and 4 having a difference in phase corresponding to 90 degrees may form the quite zone having an equalized energy density in the wireless charging zone.

Accordingly, a difference between a minimum current value and a maximum current value may be reduced when the transmitting coils 1 and 2 and the transmitting coils 3 and 4 receive a 90-degree out-of-phase current in comparison to the in-phase current and thus, a density of the quite zone formed in the 3D wireless charging zone may increase.

Figure 14:
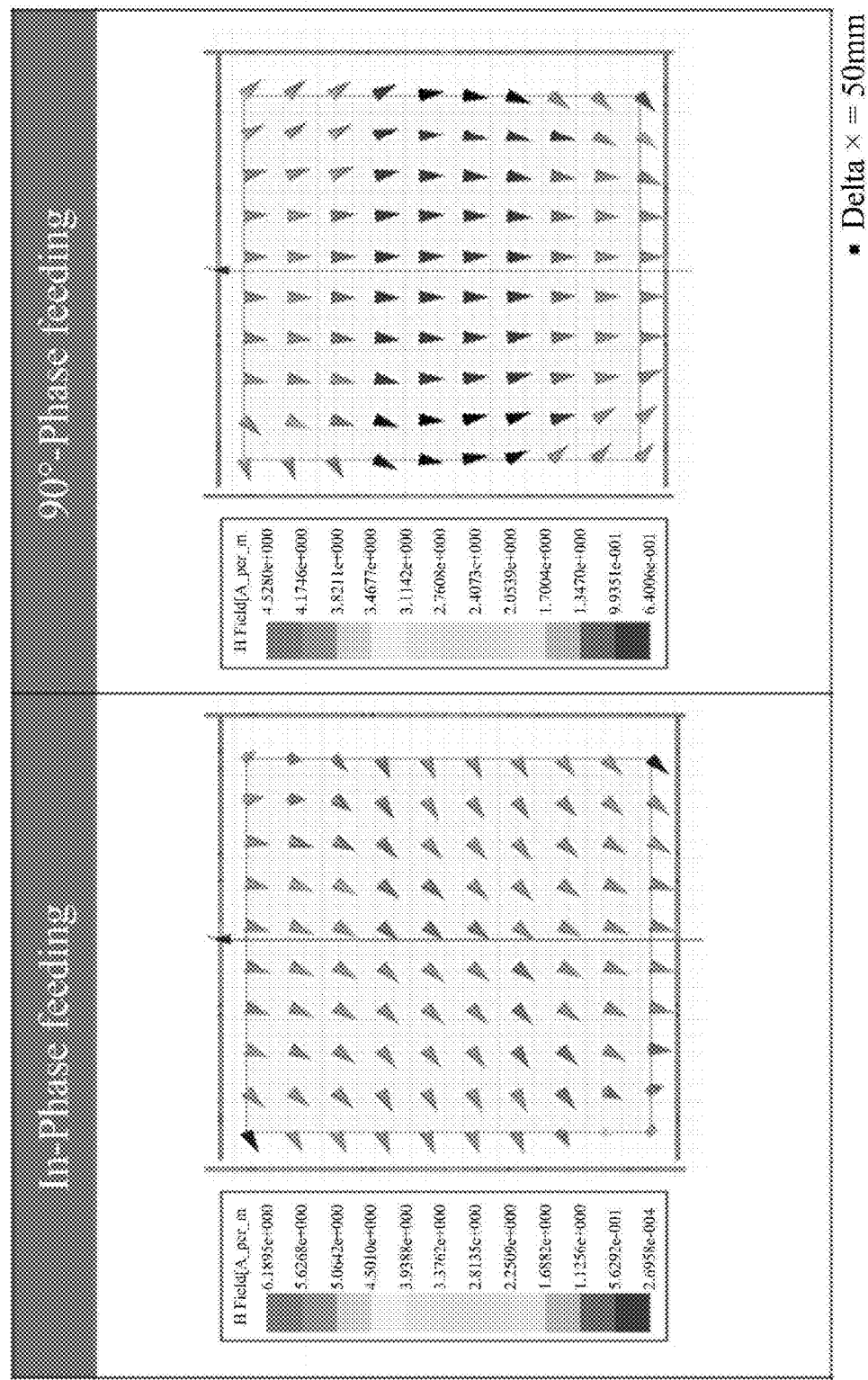
FIG. 14 is a diagram illustrating magnetic fields formed based on phases of currents according to an example embodiment.

In a result of simulations of FIGS. 13A through 14, the quite zone of the pair of the transmitting coils 1 and 2 and the pair of the transmitting coils 3 and 4 on which the in-phase feeding is performed may be distributed in a range between 0.000269 and 6.109 amperes per meter (A/m) in the wireless charging zone. Also, the quite zone of the pair of the transmitting coils 1 and 2 and the pair of the transmitting coils 3 and 4 on which the 90-degree out-of-phase feeding is performed may be distributed in a range between 0.64 and 4.52 A/m in the wireless charging zone.

Accordingly, in terms of transmitting coils arranged in a wireless charging zone, when a difference in phase between two pairs of transmitting coils, for example, the pair of the transmitting coils 1 and 2 and the pair of the transmitting coils 3 and 4 is 90 degrees, a quite zone having an optimal charging effectiveness may be formed in comparison to a case in which the in-phase feeding is performed. When a phase of a current supplied to different transmitting coils paired with each other is transitioned by 90 degrees, a magnetic field formed on the transmitting coils may be equalized.

Forming of a denser quite zone in a wireless charging zone may indicate forming of a charging zone in which a predetermined induced current may be generated irrespective of a direction and a location of a receiving coil in the wireless charging zone.

FIG. 15 is a flowchart illustrating an operation performed by a processor of a wireless charging apparatus according to an example embodiment.

In operation 1501, a wireless charging apparatus may detect whether a receiving coil is present in a wireless charging zone in a state in which a plurality of transmitting coils and power sources are arranged in the wireless charging zone. In this example, the wireless charging apparatus may be maintained in an initial standby state and may perform a charging operation when the receiving coil is present in the wireless charging zone.

In operation 1502, when the receiving coil is detected in the wireless charging zone, the wireless charging apparatus may supply currents set in the power sources to the plurality of transmitting coils and form a quite zone in the wireless charging zone. For example, the wireless charging apparatus may switch a state of an inverter maintained in the initial standby state to supply the currents to the plurality of transmitting coils. In this example, the inverter may supply the current set to have the same phase or different phases to the plurality of transmitting coils. When the inverter operates in the initial standby state, the inverter may operate in a feeding mode at the same phase.

In operation 1503, the wireless charging apparatus may supply currents including two signals having the same phase to the plurality of transmitting coils.

In operation 1505, the wireless charging apparatus may detect a value of an induced to current formed on the receiving coil using the current supplied to the plurality of transmitting coils.

When the detected value of the induced current is relatively small, the wireless charging apparatus may switch the state of the inverter in response to a feedback so as to perform feeding by changing a phase to a reversed phase of the inverter. For example, the wireless charging apparatus may change a phase of a current supplied to the plurality of transmitting coils based on the value of the induced current formed on a receiving coil. The wireless charging apparatus 101 may change a phase of a current set with respect to a current generated in a power source to a phase of a current based on an induced current. When currents set to have different phases are supplied, in operation 1504, the wireless charging apparatus may supply the current including the two signals having the different phases to the plurality of transmitting coils.

Thereafter, the wireless charging apparatus may redetect an induced current induced by a quite zone formed on the transmitting coils based on the currents of which the phases are changed.

When a value of the detected induced current is normal, in operation 1506, the wireless charging apparatus may maintain an inverter phase state without change.

In operation 1507, the wireless charging apparatus may transmit energy to the receiving coil based on the phase of current supplied from the inverter in state of the inverter in the maintained phase. Through this, the wireless charging apparatus may complete charging of the receiving coil.

In the present disclosure, there is provided an environment allowing the wireless charging apparatus to consistently verify received power or an induced current with respect to a receiving coil disposed at predetermined space, location, and location angle in a process of 3D space wireless charging such that the receiving coil consistently receives energy in a normal state.

According to an aspect, it is possible to perform a wireless charging of a battery in an electronic device using a receiving coil included in all electronic device, for example, a wearable device and an IoT device to be located in a wireless charging device based on a 3D wireless charging state in which a plurality of transmitting coils are arranged.

According to another aspect, it is possible to provide a wireless charging apparatus for performing a wireless charging without restrictions on location in a wireless charging zone by controlling a phase of a current supplied to a transmitting coil based on a direction and a gradient of a receiving coil included in the wireless charging zone.

The components described in the exemplary embodiments of the present invention may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular, however, one skilled in the art will be appreciated that a processing device may include multiple processing elements and/or multiple types of processing elements. For example, a processing device may include multiple processors or a processor and a controller. In addition, different processing configurations are possible, such as parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A wireless charging apparatus comprising:
a plurality of transmitting coils included in a wireless charging zone in a three-dimensional (3D) form; and
at least one power source configured to supply a current to the plurality of transmitting coils,
wherein the at least one pair of transmitting coils are configured to form a quiet zone indicating a magnetic field having an equalized energy density in the wireless charging zone.

2. The wireless charging apparatus of claim 1, wherein the plurality of transmitting coils includes at least one pair of transmitting coils arranged to face each other in the wireless charging zone.

3. The wireless charging apparatus of claim 2, a first pair of transmitting coils arranged to face each in the wireless charging zone is configured to supply current having first phase,
a second pair of transmitting coils arranged to face each in the wireless charging zone is configured to supply current having second phase.

4. The wireless charging apparatus of claim 3, wherein the first phase differs by 90 degrees from the second phase.

5. The wireless charging apparatus of claim 1, wherein the at least one power source includes:
an inverter configured to control a phase of the current supplied to the plurality of transmitting coils.

6. A wireless charging apparatus comprising:
a first pair of transmitting coils arranged to face each other in a wireless charging zone in a three-dimensional (3D) form;
a second pair of transmitting coils arranged to face each other in a wireless charging zone in a three-dimensional (3D) form;
a power source configured to control a phase of a current supplied to the first pair and the second pair for forming a quiet zone indicating a magnetic field having an equalized energy density in the wireless charging zone.

7. The wireless charging apparatus of claim 6, a first pair of transmitting coils arranged to face each in the wireless charging zone is configured to supply current having first phase,
a second pair of transmitting coils arranged to face each in the wireless charging zone is configured to supply current having second phase.

8. The wireless charging apparatus of claim 7, wherein the first phase differs by 90 degrees from the second phase.

9. The wireless charging apparatus of claim 6, wherein the at least one power source includes:
an inverter configured to control a phase of the current supplied to the plurality of transmitting coils.

10. A wireless charging apparatus comprising:
a plurality of transmitting coils arranged at a wireless charging zone;
a power source configured to control a phase of a current supplied to the plurality of transmitting coils for forming a quiet zone indicating a magnetic field having an equalized energy density in the wireless charging zone.

11. The wireless charging apparatus of claim 10, wherein the plurality of transmitting coils is arranged to face each other.

12. The wireless charging apparatus of claim 10, wherein the plurality of transmitting coils are configured as pair,
wherein the power source supplies current having same phase into transmitting coils in the same pair,
wherein the power source supplies current having different phase into transmitting coils in the different pair.

* * * * *